United States Patent
Bhartia et al.

(10) Patent No.: US 10,681,169 B2
(45) Date of Patent: Jun. 9, 2020

(54) SOCIAL PLUGIN REORDERING ON APPLICATIONS

(71) Applicant: Facebook, Inc., Menlo Park, CA (US)

(72) Inventors: Varun Vikram Bhartia, San Francisco, CA (US); Todd Michael Hamilton, San Francisco, CA (US); Raman Kaur Hansi, Newark, CA (US); Yugal Jindle, Newark, CA (US)

(73) Assignee: Facebook, Inc., Menlo Park, CA (US)

( * ) Notice: Subject to any disclaimer, the term of this patent is extended or adjusted under 35 U.S.C. 154(b) by 255 days.

(21) Appl. No.: 14/962,778

(22) Filed: Dec. 8, 2015

(65) Prior Publication Data

US 2017/0161281 A1    Jun. 8, 2017

(51) Int. Cl.
| | |
|---|---|
| *H04L 29/08* | (2006.01) |
| *H04W 4/029* | (2018.01) |
| *H04W 4/02* | (2018.01) |
| *H04W 4/21* | (2018.01) |

(52) U.S. Cl.
CPC ............ *H04L 67/306* (2013.01); *H04L 67/02* (2013.01); *H04L 67/18* (2013.01); *H04W 4/02* (2013.01); *H04W 4/029* (2018.02); *H04W 4/21* (2018.02)

(58) Field of Classification Search
CPC ........... G06F 17/3053; G06F 17/30554; H04L 67/02; H04L 67/18; H04L 67/306; H04L 67/42
USPC ........................................................ 707/732
See application file for complete search history.

(56) References Cited

U.S. PATENT DOCUMENTS

| | | | |
|---|---|---|---|
| 8,549,075 B2 * | 10/2013 | Stremel | G06Q 20/20 705/319 |
| 2011/0060994 A1 * | 3/2011 | Maxwell | G06F 3/147 715/730 |
| 2011/0191417 A1 * | 8/2011 | Rathod | G06Q 30/02 709/204 |
| 2012/0010995 A1 * | 1/2012 | Skirpa | G06F 3/0481 705/14.49 |
| 2012/0110073 A1 * | 5/2012 | Chakra | G06Q 10/101 709/204 |
| 2014/0156681 A1 * | 6/2014 | Lee | G06F 17/30699 707/754 |
| 2014/0244612 A1 * | 8/2014 | Bhasin | H04L 67/22 707/706 |
| 2014/0278513 A1 * | 9/2014 | Prakash | G06F 19/345 705/2 |
| 2014/0280214 A1 * | 9/2014 | Han | G06F 16/90 707/748 |
| 2014/0317078 A1 * | 10/2014 | Gallagher | G06F 17/30867 707/706 |

(Continued)

*Primary Examiner* — Syed H Hasan
*Assistant Examiner* — Nicholas E Allen
(74) *Attorney, Agent, or Firm* — Jordan IP Law, LLC

(57) ABSTRACT

In one embodiment, a method includes receiving a request from an application installed on a client system for one or more interactive elements associated with a respective platform for sharing content to a website associated with the platform, wherein the request includes a user identifier and a content identifier; calculating a ranking score for each of a plurality of interactive elements based on profile information associated with the user identifier; and sending to the application a personalized set of the interactive elements, each of the interactive elements in the personalized set having a ranking score above a threshold value.

21 Claims, 9 Drawing Sheets

(56) References Cited

U.S. PATENT DOCUMENTS

| | | | |
|---|---|---|---|
| 2015/0033305 A1* | 1/2015 | Shear | G06F 21/45 726/6 |
| 2015/0046530 A1* | 2/2015 | Mieritz | H04L 51/32 709/204 |
| 2015/0100509 A1* | 4/2015 | Pappas | G06F 17/30867 705/319 |
| 2015/0160846 A1* | 6/2015 | Ellison | H04L 41/0233 715/760 |
| 2015/0205785 A1* | 7/2015 | Beckwith | G06F 17/277 707/738 |
| 2015/0237389 A1* | 8/2015 | Grouf | H04N 21/26283 725/49 |
| 2015/0248216 A1* | 9/2015 | Li | G06F 3/0482 715/745 |
| 2015/0286383 A1* | 10/2015 | D'Aloisio | G06F 3/04847 715/748 |
| 2015/0324099 A1* | 11/2015 | Tang | G06F 3/04847 715/716 |
| 2016/0359987 A1* | 12/2016 | Laliberte | H04L 51/32 |

* cited by examiner

SOCIAL PLUGIN REORDERING ON APPLICATIONS

TECHNICAL FIELD

This disclosure generally relates to sharing content on websites using web-based and mobile applications.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a social-networking system may receive a request from an application installed on a client system for one or more interactive elements. Each of the interactive elements may be associated with a respective platform for sharing content to a website associated with the platform. The request may include, among other things, a user identifier and a content identifier. The social-networking system may calculate a ranking score for each of a plurality of interactive elements. The ranking score may be based on several types of information, such as profile information associated with the user identifier. The social-networking system may send to the application a personalized set of the interactive elements. Each of the interactive elements in the personalized set may have a ranking score above a threshold value. The interactive elements may display additional information related to the content, including the number of interactions with the content and a representation of one or more social connections of a user associated with the request. The one or more social connections may be users who previously interacted with the content by, for example, sharing the content.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
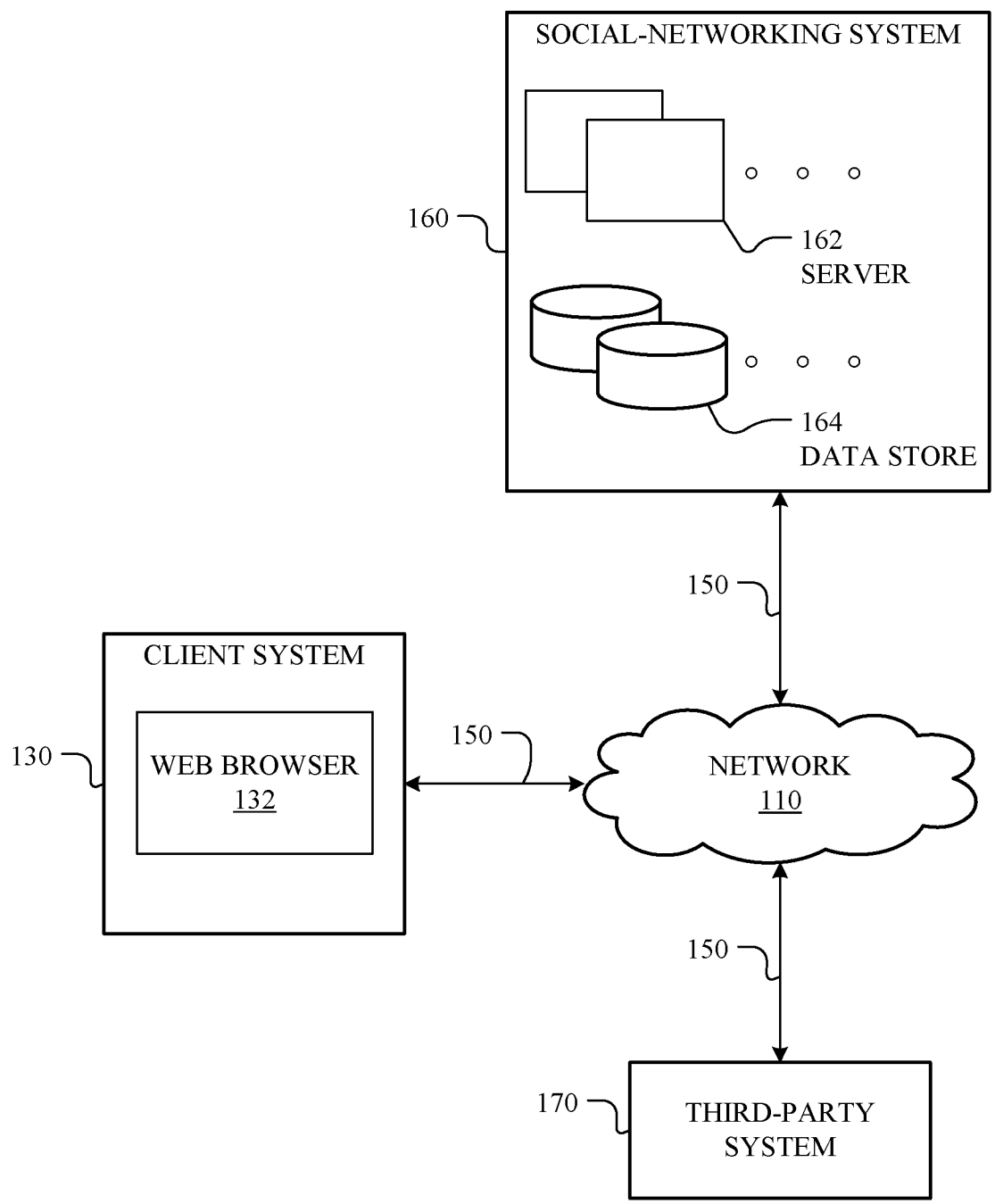
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

In particular embodiments, a social-networking system may receive a request from an application installed on a client system for one or more interactive elements. Each of the interactive elements may be associated with a respective platform for sharing content to a website associated with the platform. The request may include, among other things, a user identifier and a content identifier. The social-networking system may calculate a ranking score for each of a plurality of interactive elements. The ranking score may be based on several types of information, such as profile information associated with the user identifier. The social-networking system may send to the application a personalized set of the interactive elements. Each of the interactive elements in the personalized set may have a ranking score above a threshold value. The interactive elements may display additional information related to content associated with the request, including the number of interactions with the content and a representation of one or more social connections of a user associated with the request. The one or more social connections may be users who previously interacted with the content by, for example, sharing the content. The interactive elements may produce various benefits to the user, enriching the user experience by, for example, facilitating the sharing of the content. By facilitating the sharing of the content, the content publisher too may benefit through increased exposure of its content.

Figure 2:
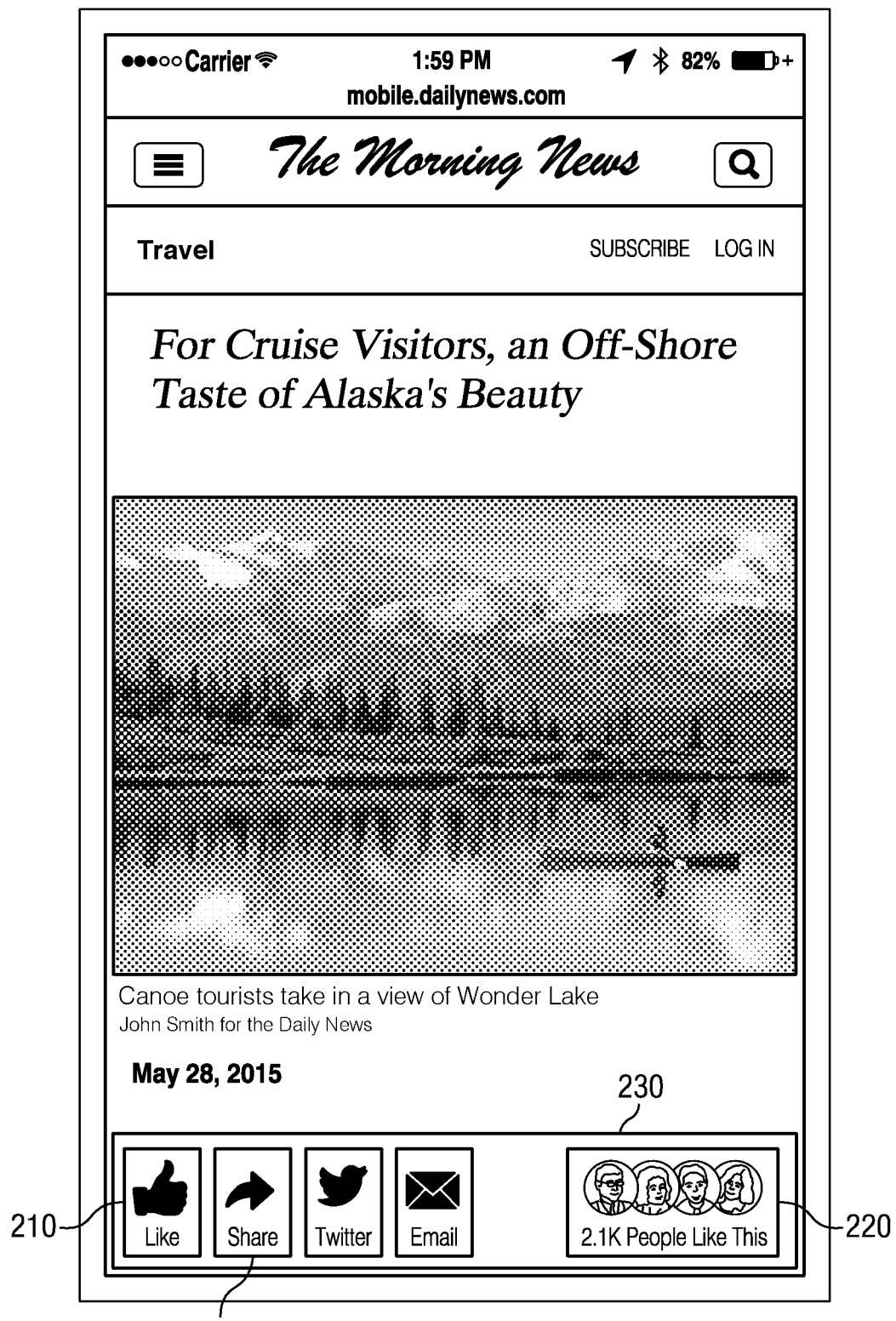
FIG. 2 illustrates an example display of content on an application of a client system along with corresponding interactive elements.

FIG. 2 illustrates an example display of content on an application of a client system 130 (e.g., a mobile device) along with corresponding interactive elements. Referencing FIG. 2, a user may have accessed the displayed content (e.g., an article about Alaska) through an application associated with the content publisher (e.g., The Morning News). Alternatively, the user may have accessed the content through a web browser application, having navigated to a URL associated with the content.

In particular embodiments, the application, through client system 130, may send a request to social-networking system 160 for one or more interactive elements. The one or more interactive elements may be associated with a respective platform that may enable sharing of the content to one or more websites associated with the platform. As an example and not by way of limitation, referencing FIG. 2, interactive element 220 may be associated with a platform for sharing content to a particular social-networking website. In particular embodiments, a single interactive element may be associated with a platform for sharing content to more than one website. As an example and not by way of limitation, interactive element 220 may be associated with a platform for sharing content on two different social-networking websites, so that one or both of the social-networking websites may be selected (e.g., by a further user input) for sharing the content. The one or more interactive elements may correspond to plugins that enable user interaction with a platform, the plugins having been installed on client system 130. Such plugins may include, for example, a browser plugin or a plugin for a non-browser application. In particular embodiments, each interactive element may have its own corresponding plugin; in some embodiments, more than one interactive element may correspond to a single plugin. In particular embodiments, the request may be sent in response to the user having accessed content through the application. In particular embodiments, the request may be sent in response to a selection input from the user, where the selection input may select a subset of content within the accessed content. As an example and not by way of limitation, referencing FIG. 2, a user who has accessed the displayed content may select the image directly above the text "Canoe tourists take in a view of Wonder Lake" (e.g., by tapping or pressing the region associated with the image on a touchscreen of a client system 130, by clicking on the image, by highlighting the image). In particular embodiments, social-networking system 160 may select a subset of the content on its own, without further input, based on information associated with the content and how it has been shared historically by other users, based on information associated with the user, or a combination thereof. As an example and not by way of limitation, social-networking system 160 may determine that a video embedded within an article is to be selected based on the information that other users have historically selected that video for sharing (e.g., from within the same article, from within other articles, or generally). Within this disclosure, "sharing" content refers to any method of distributing content to other users on a website. Sharing includes, but is not limited to, distributing a link to the content, distributing the content itself of an instance thereof, or interacting with the content on a website of a platform such that the content is thereby displayed to other users (e.g., commenting on, "liking," or rating content on a social-networking website and thereby causing the content to be displayed on a newsfeed page or a wall of another user on the social-networking website). Although this disclosure describes sending a particular request for particular items in a particular manner, this disclosure contemplates sending any suitable requests for any suitable items in any suitable manner.

In particular embodiments, the request sent to social-networking system 160 may include a user identifier and a content identifier. The user identifier may correspond to a user associated with the request. As an example and not by way of limitation, the user identifier may correspond to a user of social-networking system 160. As another example and not by way of limitation, the user identifier may correspond to a user who is not a user of social-networking system 160 but is nevertheless associated with client system 130. As another example and not by way of limitation, the user identifier may correspond to a user who has logged on to client system 130 or the application (e.g., by entering a username and password associated with a respective account, by way of a fingerprint scan), or who is otherwise identified by client system 130 or the application. The content identifier may correspond to the content that is associated with the request. As an example and not by way of limitation, referencing FIG. 2, the content identifier may correspond to an article about Alaska titled "For Cruise Visitors, an Off-Shore Taste of Alaska's Beauty." In particular embodiments, the content identifier may correspond to a subset of the accessed content (e.g., referencing FIG. 2, the image directly above the text "Canoe tourists take in a view of Wonder Lake").

In particular embodiments, social-networking system 160 may calculate a ranking score for each of a plurality of interactive elements. In particular embodiments, the ranking score may be based on a global popularity of a platform or a website associated with the interactive element. As an example and not by way of limitation, an interactive element associated with a popular photo-sharing website may receive a higher ranking score than one associated with a less popular photo-sharing website. Although this disclosure describes calculating a particular score for particular items in a particular manner, this disclosure contemplates calculating any suitable score for any suitable items in any suitable manner.

In particular embodiments, the ranking score may be based on information associated with the displayed content. Social-networking system 160 may determine information associated with the content by identifying characteristics of the content. One such characteristic may include a content type. The content type may be a descriptor of one or more media formats (e.g., a photo, a video, a sound clip, text, any combination thereof). The content type may be extracted from metadata associated with the content or based on the source of the content. In particular embodiments, the ranking score may be based on the popularity of the content on particular websites. As an example, referencing FIG. 2, if the displayed content is popular on the social-networking website associate with interactive element 210 (e.g., content that has been shared a threshold number of times on the website), interactive element 210 may receive a relatively high score.

In particular embodiments, the ranking score may be based on an analysis of the content to determine one or more topics associated with the content. As an example of content analysis and not by way of limitation, social-networking system 160 may perform an image search of a photo content on a social-networking website (either natively or by way of a third-party search engine) to determine that the photo is from a vacation in Hawaii. In performing a native search, for example, the image search may be performed on social-networking system 160 by querying a media index of social-networking system 160 for media items that are, to a threshold degree, similar to the content (e.g., by using image recognition technology to compare patterns or sequences of pixels in the photo with media items in the media index). In the case of the photo from the Hawaii vacation, the media index may have several media items that are determined to be similar to a threshold degree. The media items may already be indexed with associated topics that may have been determined from metadata, text from posts in which they were shared, other associated text, or any other suitable method. Media indexes and topic associations are further disclosed in U.S. patent application Ser. No. 14/609,084, filed 29 Jan. 2015. As another example of content analysis and not by way of limitation, social-networking system 160 may parse the text of the displayed content, extracting n-grams of the content and associating them with one or more topics. For example, referencing FIG. 2, social-networking system 160 may extract some or all of the n-grams from the article (e.g., "canoe tourists," "canoe," "alaska," "alaska's," "wonder lake"). Social-networking system 160 may also extract n-grams from the metadata of the article, from the URL of the article (e.g., "dailynews.com," "dailynews"), or any other suitable source. Social-networking system 160 may then query a topic index that indexes topics with n-grams that may have been extracted from posts on the online social network, metadata from those posts, other associated text, or by any other suitable method. More information on how n-grams are associated with topics, topic indexes, and on topic association generally, may be found in U.S. patent application Ser. No. 13/167,701, filed 23 Jun. 2011, and U.S. patent application Ser. No. 14/585,782, filed 30 Dec. 2014, which are both incorporated by reference. Referencing FIG. 2, based on the n-grams from the article, social-networking system 160 may determine that the displayed content is related to the topic "Alaska" or "Alaska Tourism." The ranking score of an interactive element may be based on a correlation between one or more of the determined topics and the platform or website associated with the interactive element corresponding to the ranking score. As an example and not by way of limitation, a photo determined to be associated with the topic "Hawaii Vacation" may cause an interactive element associated with a social photo-sharing website to receive a relatively high score, and at the same time may cause an interactive element associated with a professional social network to receive a relatively low score. The converse may be true for a photo determined to be associated with the topics "Lex Corporation" and "Annual Industry Conference." Social-networking system 160 may also recognize that certain types of content are not likely to be shared publicly and may as a result calculate a higher score for an interactive element associated with a private platform (e.g., email). Although this disclosure describes content analysis by searching indexes natively on social-networking system 160, the searches may alternatively or additionally be performed on indexes of third-party systems.

In particular embodiments, the ranking score may be based on information about the content publisher. The content publisher may be the entity associated with the application sending the request (e.g., the application being used to access the displayed content). As an example and not by way of limitation, referencing FIG. 2, the content publisher may be the entity associated with the application that is being used to access the displayed content (e.g., The Morning News). Alternatively or additionally, the content publisher may be the original publisher from which the content is sourced. As an example and not by way of limitation, again referencing FIG. 2, the content publisher may be Daily News, which may be a news source from which The Morning News application scraped the article (i.e., the original publisher). In some instances, the content publisher may simultaneously be both the entity associated with the application sending the request and the original publisher. As another example and not by way of limitation, again referencing FIG. 2, The Morning News may be an application associated with Daily News. The ranking score may be based on the content publisher. As an example and not by way of limitation, social-networking system 160 may recognize that a content publisher is a gossip column and that a user would therefore be more likely to share content from that content publisher on a social website rather than on a professional website. Accordingly, an interactive element associated with the social platform may receive a higher ranking score than one associated with the professional website. As another example and not by way of limitation, social-networking system 160 may determine that the content publisher is a blog and as a result calculate a higher ranking score for interactive elements associated with websites where the sharing of blog content is popular.

In particular embodiments, the ranking score may be based on profile information associated with the user identifier. The profile information may be information stored on a social graph of social-networking system 160. The profile information may include information about the user's connections. The user's connections may be determined by querying the social graph of social-networking system 160. Alternatively or additionally, social-networking system 160 may determine the user's connections through third-party websites. As an example and not by way of limitation, social-networking system 160 may query third-party websites using a third party search engine, which may return search results including a webpage associated with the user's high school containing a list of the user's classmates. Alternatively or additionally, social-networking system 160 may access third-party social networks for contacts of the user (e.g., contacts connected to the user through an online video gaming network). Alternatively or additionally, social-networking system 160 may access requesting client system 130 for locally stored information about the user's contacts (e.g., a contact list on a mobile phone). Social-networking system may also access other client systems 130 associated with the user to determine the user's contacts (e.g., a contact list stored on a video game console registered to the user). From an understanding of the user's connections, social-networking system 160 may be able to tailor the ranking scores in meaningful ways. As an example and not by way of limitation, if a large number of the user's connections are active on Website A rather than Website B, the ranking score of an interactive element associated with Website A may be higher than the ranking score of an interactive element associated with Web site B. As another example and not by way of limitation, if a large number of the user's connections are professional contacts (e.g., people employed in the same field or company), the ranking score of an interactive element associated with a professional social-networking website may receive a relatively high ranking score. The profile information may include historic data associated with the user. In particular embodiments, the historic data may include an engagement level of the user identified by the user identifier. As an example and not by way of limitation, the engagement level may describe how frequently the user uses a particular website, how frequently the user uses a particular platform to share content on a particular website, how frequently the user uses interactive elements to share content, how frequently the user uses particular interactive elements, how frequently the user shares content, how frequently the user uses client system 130 for sharing content, how frequently the user uses client system 130 for sharing content on particular platforms, or any combination thereof. In particular embodiments, the historic data may include information about previous interactions (e.g., shares, views) with particular content, the previous interactions having been performed by the user. As an example and not by way of limitation, referencing FIG. 2, a user's historic data may include the number of times the user has previously shared or viewed content about Alaska. As another example and not by way of limitation, the user's historic data may include information about games the user has played or purchased. In particular embodiments, the historic data may include information about previous interactions with particular content on the application sending the request. As an example and not by way of limitation, referencing FIG. 2, a user's historic data may include the number of times the user has shared or viewed content about Alaska on the application (e.g., The Morning News application). In particular embodiments, the historic data may include information about previous interactions with particular content on particular platforms or websites. As an example and not by way of limitation, referencing FIG. 2, a user's historic data may include the number of times the user has viewed or shared content about Alaska on a website associated with interactive element 220. In particular embodiments, the historic data may include information about the method in which the user has shared content. As an example and not by way of limitation, a user's historic data may account for the number of times the user has shared content by liking it (e.g., by activating interactive element 210, which may cause the content to be shared as a liked item on a particular social-networking website), as opposed to other methods such as commenting or posting the content (e.g., by activating interactive element 220, which may cause the content to be shared as a post on the same social-networking website).

In particular embodiments, the profile information may include demographic information of the user. The demographic information may include location information associated with the user. As an example and not by way of limitation, the demographic information may reflect that a user grew up in Smallville, in which case an interactive element associated with a dating website for people with ties to Smallville may receive a relatively high ranking score. The demographic information may include other demographic attributes associated with the user such as age, race, ethnicity, political affiliations, profession, or education. As an example and not by way of limitation, an interactive element associated with a professional social network may receive a higher ranking score in the case of a user who is 30 years old than in the case of a user who is 8 years old. In particular embodiments, the profile information may also include personal information of the user, including interests, hobbies, or preferences of the user. As an example and not by way of limitation, an interactive element associated with a social-networking website for technology enthusiasts may receive a relatively high score if the user has indicated an interest in solar power.

Profile information of the user may be entered by the user (e.g., into the user's profile on social-networking system 160, into a registration form associated with the application, into a registration form for a website associated with an interactive element, into a questionnaire) or may be determined by historical user behaviors (e.g., by a count of the number of times the user has shared related content).

In particular embodiments, the ranking score may be based on information specific to client system 130 sending the request. Such information specific to client system 130 may include the location of client system 130 (e.g., at the time it sends the request, at some time before it sends the request). As an example and not by way of limitation, if client system 130 is determined to be located in Peru, interactive elements associated with websites that are popular in Peru may receive a relatively high score. As another example and not by way of limitation, the same may be true if client system 130 is determined to have ever been in Peru for a threshold time duration or if client system 130 was in Peru within a specified time period. In particular embodiments, the location of client system 130 may be determined by or received at social-networking system 160 at or around the time the request is received. As an example and not by way of limitation, client system 130 may send, directly to social-networking system 160, location information when it sends the request. As another example and not by way of limitation, client system 130 may send location information to a server associated with the application, which may then convey the location information to social-networking system 160. Information specific to client system 130 may also include device settings. As an example and not by way of limitation, if client system 130 is set to French, an interactive element corresponding to a website that is popular among French-speakers may receive a relatively high rank. As another example and not by way of limitation, if client system 130 is set to French and if there exists a particular French-specific interactive element that is equivalent to a particular English-specific interactive element, the French-specific interactive element may receive a higher score than its English counterpart (e.g., referencing FIG. 2, interactive element 210 with the text "Like" may be replaced by an equivalent interactive element with the text "J'aime," which roughly translates to "I like"). Information specific to client system 130 may also include information about technical features of client system 130. As an example and not by way of limitation, the operating system of client system 130 may not be suitable for sharing content on a particular platform or a particular website, in which case an interactive element associated with such platform or website may receive a relatively low ranking score. As another example and not by way of limitation, the hardware features of client system 130 may similarly affect the ranking score (e.g., if a client system 130 does not have the ability to display images, the ranking score of an interactive element associated with a photo-sharing website may receive a relatively low score). Information specific to client system 130 may also include information about what applications are installed on the device. As an example and not by way of limitation, an interactive element associated with a social website for sharing content relating to video games may receive a relatively high score if client system 130 has a threshold number of video-game applications installed. Information specific to client system 130 may also include historic data associated with client system 130, which may include the same or similar information as the profile-information historic data described above. As an example and not by way of limitation, the number of times content has been viewed or shared on a particular website using client system 130 may be used to determine the ranking score of an interactive element associated with the particular website. Information specific to client system 130 may also include information about how systems such as client system 130 are typically used. As an example and not by way of limitation, client system 130 may be a mobile phone, which may be a system typically used to share photos on photo-sharing websites (as may be determined by, for example, studying user behavior, market surveys). As such, interactive elements for one or more photo-sharing websites may receive a relatively high score.

The ranking score may be calculated in any suitable manner using the above-described factors. As an example and not by way of limitation, an interactive element associated with a platform for sharing content on a photo-sharing platform may receive a relatively high ranking score if the user has a high engagement level with the photo-sharing platform. Conversely, an interactive element associated with a website for which the user has not registered (or for which the user does not otherwise have an account) may receive a relatively low ranking score. The different factors may be combined in any suitable manner. In particular embodiments, the factors on which the ranking score is based may be weighted. As an example and not by way of limitation, the engagement level of a user with a particular platform may be weighted higher than the user's previous interactions with particular content. As another example and not by way of limitation, the location of client system 130 sending the request may be weighted higher than the demographic information of the user.

The ranking score may be adjusted upward or downward based on whether social-networking system 160 finds that different factors match or complement each other. As an example and not by way of limitation, social-networking system 160 may determine that a user who is a game developer (e.g., by considering the user's profile) reading an article about a new video game may be likely to share the article on a professional website—even though ordinarily, such an article may be expected to be shared on a social website. In such a case, the ranking score of the interactive element associated with the professional website may be adjusted upward (alternatively or additionally, the ranking scores of social websites may be adjusted downward). As another example and not by way of limitation, social-networking system 160 may determine that a user is more likely to share content on a particular platform if a threshold number of the user's connections generally, or if a threshold number of the user's connections within a particular group (e.g., the user's coworkers), has already shared that content on the particular platform. Alternatively, social-networking system 160 may determine that a user is more likely to share content on a particular platform if a threshold number of the user's connections has not posted the content, perhaps because the user does not want to be redundant. As yet another example, social-networking system 160 may determine that a user who tends to be a private individual (as determined by the user's historic data or from the user's specified preferences) is unlikely to share certain types of content publicly (e.g., family pictures) even though the content is not inherently of a private nature and may therefore be more likely to share it on private platforms. In such a case, an interactive element associated with a private messaging platform may receive a higher score than an interactive element associated with a public photo-sharing web site.

The information described above, on which the ranking scores are based, may be stored on a server associated with social-networking system 160. Alternatively or additionally, the information may be stored locally on client system 130, on a server associated with the application, on a server associated with one or more of the platforms, or on any other suitable third-party server. In such cases, the information may be sent to social-networking system 160 so that it may be used in calculating the ranking score. The information may be sent to social-networking system 160 along with the request. Alternatively or additionally, the information may be sent in response to a request from social-networking system 160. Alternatively or additionally, the information may be sent periodically (e.g., hourly, weekly) or whenever there is a threshold quantity of updates. In particular embodiments, the information may be from multiple sources. As an example and not by way of limitation, a location of client system 130 may be sourced from client system 130, some historical data may be sourced from the application server, account information about the user in connection with a website associated with an interactive element (e.g., whether or not the user has registered for the website) may be sourced from the associated third-party server, and demographic information may be sourced from a social graph of social-networking system 160.

In particular embodiments, social-networking system 160 may send to the application a personalized set of interactive elements. These interactive elements may be displayed on client system 130. Each of the interactive elements in the personalized set may have been selected for having a ranking score above a threshold value. Social-networking system 160 may perform this selection by first ranking all available interactive elements and then selecting the interactive elements with ranking scores above a pre-determined threshold value. The ranking scores may be a rank and the threshold value may be a threshold rank. As an example and not by way of limitation, a threshold rank of three may cause the selection of the top three interactive elements. The ranking scores may also be a non-rank score. As an example and not by way of limitation, a threshold score of fifty may select all interactive elements having a ranking score above fifty, in which case the overall number of interactive elements selected may vary (though the overall number may be limited by an upper and lower bound). Alternatively, social-networking system 160 may simply select a set number of interactive elements based on the ranking scores. Social-networking system 160 may also categorize interactive elements and ensure that there is a predefined level of diversity in the personalized set. As an example and not by way of limitation, the personalized set may consist of an email interactive element, a professional website interactive element, a social website interactive element, and a photo-sharing website's interactive element. Diversity may be desirable in that it may allow the user to have a wider range of options within immediate reach. As an example and not by way of limitation, diversity may prevent a scenario where all the interactive elements in the personalized set are associated with professional websites (e.g., for content closely related to the user's occupation), in which case the user's options for sharing may be perceived as limited.

In particular embodiments, the interactive elements of the personalized set may be ordered based on their respective scores. As an example and not by way of limitation, the interactive elements may be ordered from left to right in descending order of ranking scores. As another example and not by way of limitation, the interactive elements may be ordered in some other optimized manner where the interactive elements with higher scores are placed in more prominent locations (e.g., referencing FIG. 2, interactive elements 210 and 220 may be in more prominent locations than the interactive elements in between them). As another example and not by way of limitation, the interactive elements may be ordered such that two similar-looking interactive elements are not placed next to each other. This may reduce user confusion. As another example and not by way of limitation, social-networking system 160 may determine, from previous usage, that a user often mistakenly activates a particular interactive element, when another interactive element is intended to have been activated, when the interactive elements are laid out in one or more particular orders. Social-networking system 160 may determine that this is the case by observing that the user often activates interactive element 240, cancels the resulting prompt, and then activates interactive element 210, indicating that it was interactive element 210 that the user intended to activate. In so determining, social-networking system 160 may ensure that these two interactive elements are not placed adjacent to each other. As another example and not by way of limitation, social-networking system 160 may have preset ordering algorithms that recommend certain orders over others (e.g., an algorithm that attempts to ensure that interactive element 210 and interactive element 240 are not placed adjacent to each other). Although this disclosure describes selecting and sending a particular set of particular items in a particular manner, this disclosure contemplates selecting and sending any suitable set of any suitable items in any suitable manner.

In particular embodiments, the individual interactive elements within the personalized set may also be personalized for the user. As an example and not by way of limitation, referencing FIG. 2, interactive element 220 may include the display of a "FacePile," which may be a visual representation of one or more social connections of the user (e.g., the profile pictures of the social connections). In selecting the one or more social connections for interactive element 220, social-networking system 160 may have initially identified one or more social connections of the user by querying a social graph for connections of the user within certain parameters (e.g., first-degree connections, connections of a certain demographic, connections associated with a particular location). Social-networking system 160 may then determine one or more of the identified social connections that have interacted with the content. Social-networking system 160 may calculate a social-relevance score for each of the determined social connections based on any of several factors or a combination thereof (e.g., a measure of previous social interactions between the social connection and the user, a measure of affinity between the social connection and the user, demographic information of the social connection). Social-networking system 160 may then select one or more of the determined social connections having a social-relevance score greater than a threshold value. The appearance of an individual interactive element may also be personalized for the user based on personal preferences. As an example and not by way of limitation, the user may be able to specify the icon associated with a particular interactive element. As another example and not by way of limitation, if the user has subscribed to a premium service associated with a particular website, the appearance of the interactive element associated with the particular website may be changed to reflect the user's premium status. The functionality of an interactive element may also be personalized. As an example and not by way of limitation, referencing FIG. 2, activating interactive element 210 may result in the content being shared as a like on both a photo-sharing website and a professional social-networking website based on the user having indicated a preference for such sharing. Conversely, if the user has indicated a preference for sharing the content only on the professional social-networking website (or if the user does not have an account on the photo-sharing website), activating interactive element 210 may result in the content being shared only on the professional social-networking website. In particular embodiments, one or more of the individual interactive elements may be personalized to include a representation of the number of shares associated with the content. As an example and not by way of limitation, a "share icon" may be displayed adjacent to respective interactive elements with a numerical descriptor representing the number of shares on a platform or website associated with the respective interactive elements.

Figure 3:
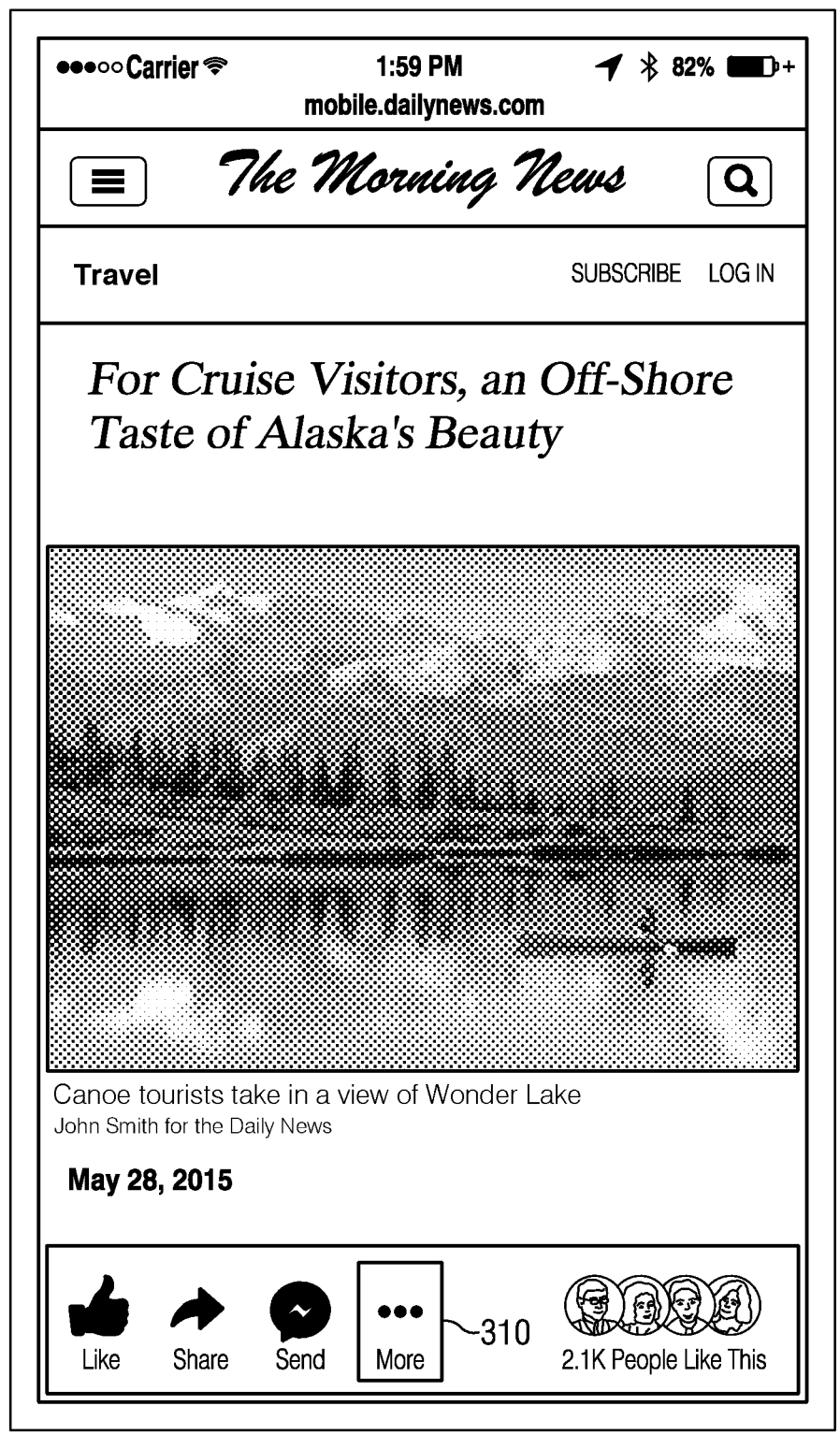
FIG. 3 illustrates a personalized set of interactive elements that includes a trigger element.
Figure 4A:
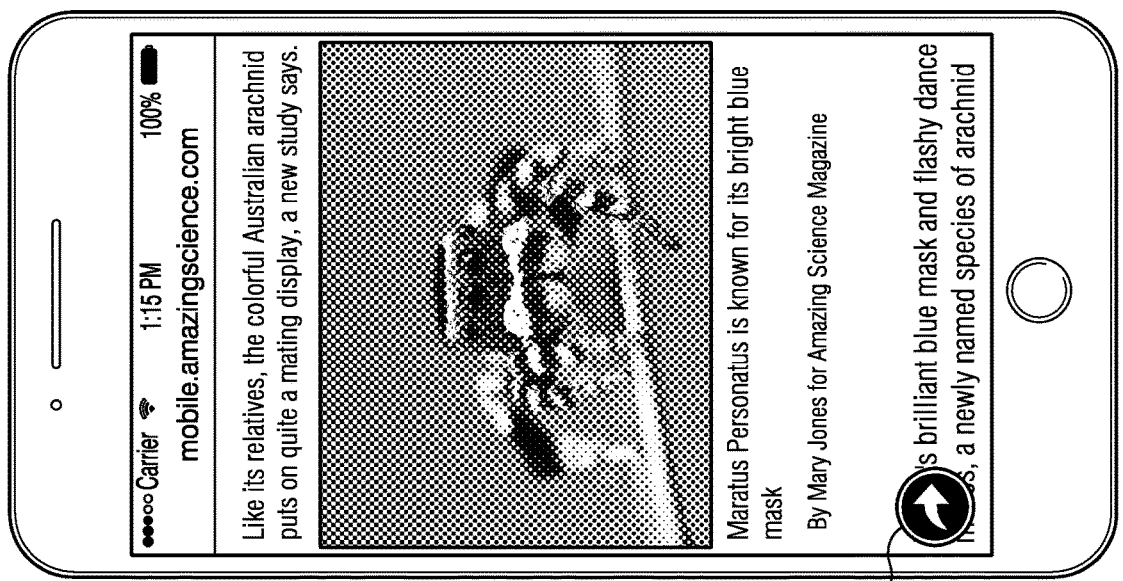
FIG. 4A illustrates an embodiment where only a trigger element is initially sent.
Figure 4B:
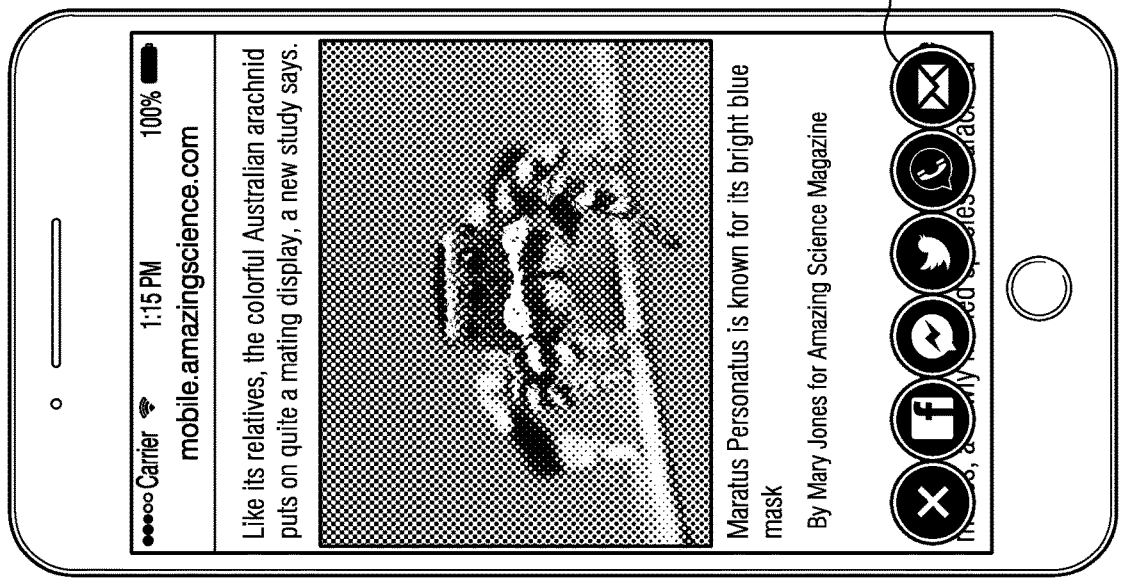
FIG. 4B illustrates an embodiment where a personalized set of interactive elements sent in response to an activation of the trigger element illustrated in FIG. 4A.

These share icons are discussed in further detail below with respect to FIG. 5. In particular embodiments, social-networking system 160 may include within the personalized set of interactive elements a trigger element that, when activated, may cause additional interactive elements to be displayed. FIG. 3 illustrates a personalized set of interactive elements that includes a trigger element. As an example and not by way of limitation, referencing FIG. 3, activating trigger element 310 may cause a pop-up display of a number of additional interactive elements. Alternatively, activating trigger element 310 may cause the already-displayed interactive elements to be replaced with a new set of personalized interactive elements. In particular embodiments, social-networking system 160 may send only a trigger element initially, and may send a personalized set of interactive elements only in response to the trigger element being activated. FIG. 4A illustrates an embodiment where only trigger element 410 is initially sent. Upon activation of trigger element 410, a personalized set of interactive elements may be sent to client system 130. FIG. 4B illustrates an embodiment where a personalized set of interactive elements sent in response to an activation of trigger element 410.

In particular embodiments, the interactive elements are located within a fixed region on client system 130. As an example and not by way of limitation, referencing FIG. 2, the interactive elements may be within social bar 230, which spans horizontally at the bottom of the screen. The social bar may alternatively span vertically. The social bar may also be split (e.g., across the bottom and across a side). The social bar may be a visible element displayed on the screen, as in FIGS. 2 and 3 or it may be invisible as may be the case in FIGS. 4A and 4B. In particular embodiments, the interactive elements may not be contained within a social bar and may instead be free-floating within the display.

In particular embodiments, activating an interactive element (e.g., by pressing or tapping on a touch screen, by clicking on it with a cursor) may cause the content to be shared on an associated website. The displayed content may be shared following the activation (e.g., immediately, or after a specified amount of time previously specified by the user) without any further input from the user. Alternatively, the displayed content may be shared after receiving a further input from the user, which may be in response to a relevant prompt (e.g., "Do you want to share this content on Website X?"). In the case where a single interactive element corresponds to multiple websites, the relevant prompt may ask the user to select the websites on which the content is to be shared (e.g., by allowing the user to select appropriate checkboxes).

Figure 5:
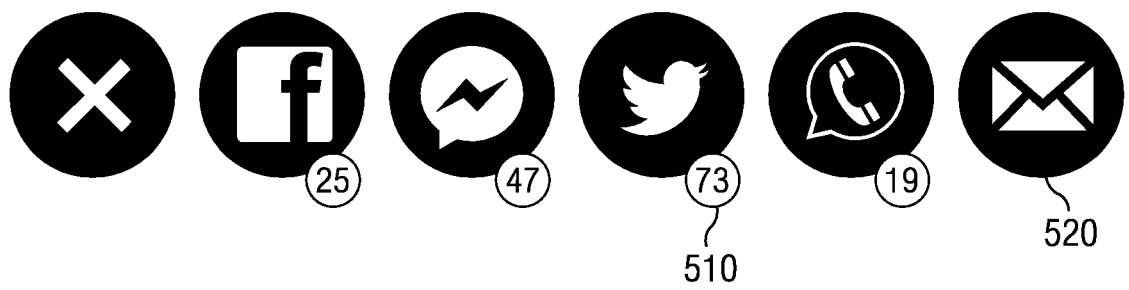
FIG. 5 illustrates an example of a set of interactive elements, each associated with a share icon that may represent the number of shares of the displayed content on the associated platform.

FIG. 5 illustrates an example of a set of interactive elements, each associated with a share icon that may represent the number of shares of the displayed content on the associated platform. Share icon 510 may be a representation that the displayed content has been shared on the associated platform seventy-three times. Interactive element 520 does not have a share icon, which may indicate that the displayed content has not yet been shared on the platform associated with interactive element 520. In particular embodiments, the share icons may represent only the number of shares by connections of the user (e.g., first-degree connections). In particular embodiments, the share icons may represent the number of shares globally (whether or not the user is connected to the entities that made the shares).

Figure 6:
FIG. 6 illustrates a display of a prompt that may enable the user to specify how the content is shared.

FIG. 6 illustrates a display of a prompt that may enable the user to specify how the content is shared. The prompt may enable the user to specify a medium of sharing available on the associated website (e.g., as a private message, as a wall post on a social connection's wall, as a timeline or status update). The sharing medium may be set to a default sharing medium based on the same factors used to calculate ranking scores (e.g., historical data pertaining to how the user has previously shared content on the associated website, how other users on the website share data). As an example and not by way of limitation, prompt 610 sets the default sharing medium to be "On Your [i.e., the user's] Timeline." The prompt may also allow the user to specify a privacy setting (e.g., allowing only certain people to see the shared content) or to specify certain social connections or certain groups of people with whom to share the content. The prompt may also allow the user to add commentary alongside the content that is to be shared. As an example and not by way of limitation, prompt 610 asks the user to "Say something about [the content that is to be shared]." The prompt may also allow the user to tag social connections or to specify a location or entity (e.g., a restaurant) associated with the content.

In particular embodiments, upon activation of an interactive element, social-networking system 160 may determine that the content has been previously shared on the associated website or platform before, either by the user or by the user's connections (e.g., first-degree social connections). Social-networking system 160 may then present this information to the user (e.g., by displaying a number representing the number of connections who have shared the content or by displaying a profile pictures the connections). Social-networking system 160 may present a further prompt to the user, asking the user to confirm that the content is to be shared. Social-networking system 160 may also offer the user the option to interact with one or more previously shared instances of the content. As an example and not by way of limitation, social-networking system 160 may enable the user to share the content as a reshare of one or more of the previously shared instances. As another example and not by way of limitation, social-networking system 160 may enable the user to share the content by posting a comment on one or more of the previously shared instances. As another example and not by way of limitation, social-networking system 160 may enable the user to share the content by liking or rating one or more of the previously shared instances.

In particular embodiments, social-networking system 160 may keep track of how many times (globally or within particular groups of users) each interactive element is pressed for particular content, or how often it was actually shared to different websites using the interactive elements. Social-networking system 160 may also request some of this data from the platforms associated with the interactive elements. In particular embodiments, social-networking system 160 may send analytics data to the application or to the content publisher about user behaviors in sharing or viewing content. Social-networking system 160 may send data about the different platforms and websites content is being shared on or viewed and the types of users sharing or viewing the content. As an example and not by way of limitation, referencing FIG. 4A, social-networking system 160 may send data to the content publisher (e.g., Amazing Science Magazine) about the number of users who have activated interactive element 420. As another example and not by way of limitation, social-networking system 160 may send data to the content publisher about the number and type of users who have shared or viewed the content on the platform or website associated with interactive element 420. This information may be valuable for application developers or content publishers in creating targeted content and targeted advertisements. As an example and not by way of limitation, a content publisher may come to understand that users in their twenties share content on certain platforms more than others and may correspondingly focus on making articles relevant to users in their twenties compatible with those platforms. As another example and not by way of limitation, an entity affiliated with an application may advertise its content on Website A rather than Website B in a geographical region where that content is shared more frequently on Website A.

Figure 7:
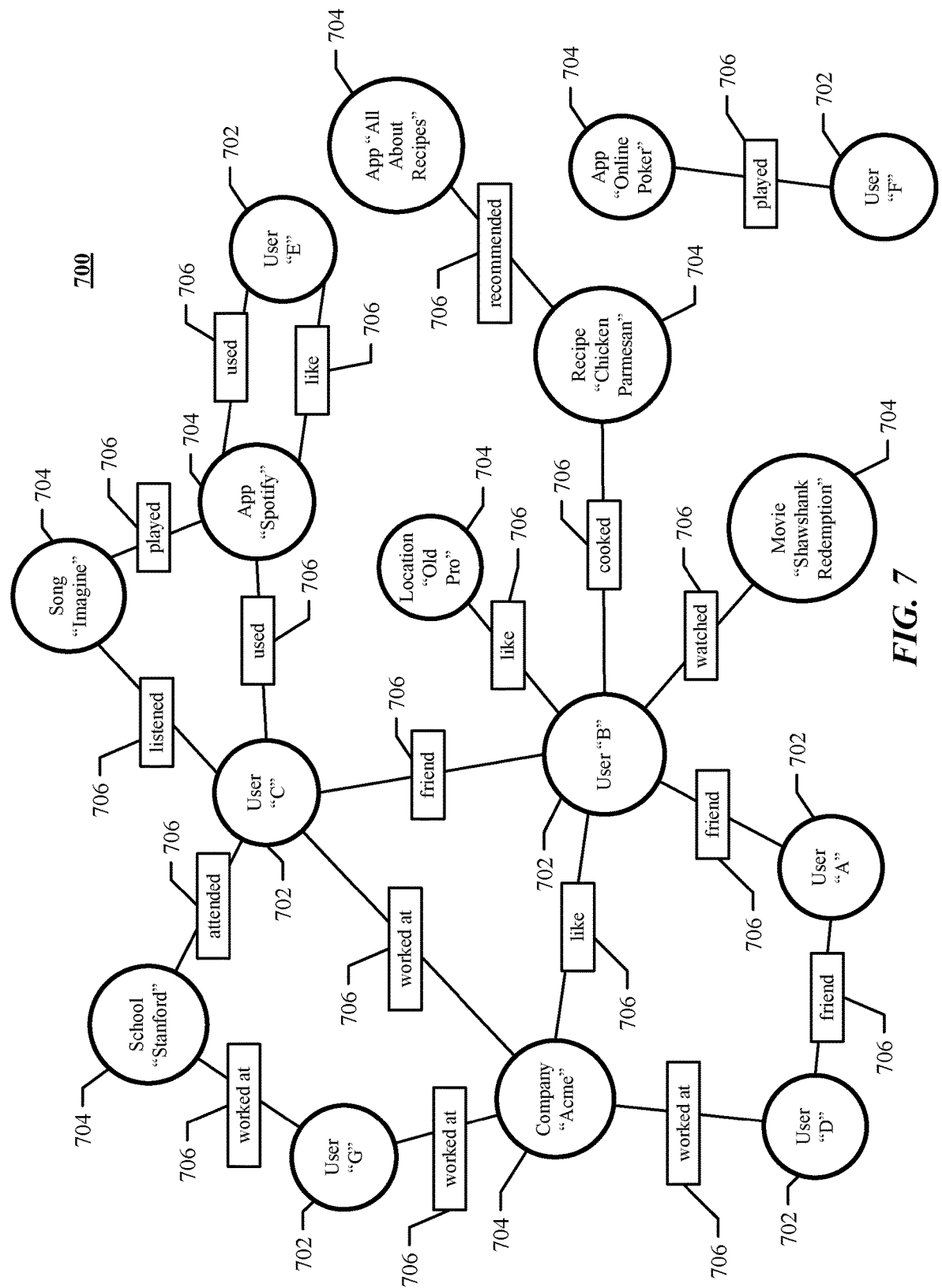
FIG. 7 illustrates an example social graph.

FIG. 7 illustrates example social graph 700. In particular embodiments, social-networking system 160 may store one or more social graphs 700 in one or more data stores. In particular embodiments, social graph 700 may include multiple nodes—which may include multiple user nodes 702 or multiple concept nodes 704—and multiple edges 706 connecting the nodes. Example social graph 700 illustrated in FIG. 7 is shown, for didactic purposes, in a two-dimensional visual map representation. In particular embodiments, a social-networking system 160, client system 130, or third-party system 170 may access social graph 700 and related social-graph information for suitable applications. The nodes and edges of social graph 700 may be stored as data objects, for example, in a data store (such as a social-graph database). Such a data store may include one or more searchable or queryable indexes of nodes or edges of social graph 700.

In particular embodiments, a user node 702 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 702 corresponding to the user, and store the user node 702 in one or more data stores. Users and user nodes 702 described herein may, where appropriate, refer to registered users and user nodes 702 associated with registered users. In addition or as an alternative, users and user nodes 702 described herein may, where appropriate, refer to users that have not registered with social-networking system 160. In particular embodiments, a user node 702 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 702 may be associated with one or more data objects corresponding to information associated with a user. In particular embodiments, a user node 702 may correspond to one or more webpages.

In particular embodiments, a concept node 704 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in an augmented/virtual reality environment; another suitable concept; or two or more such concepts. A concept node 704 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 704 may be associated with one or more data objects corresponding to information associated with concept node 704. In particular embodiments, a concept node 704 may correspond to one or more webpages.

In particular embodiments, a node in social graph 700 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 704. Profile pages may be viewable by all or a selected subset of other users. As an example and not by way of limitation, a user node 702 may have a corresponding user-profile page in which the corresponding user may add content, make declarations, or otherwise express himself or herself. As another example and not by way of limitation, a concept node 704 may have a corresponding concept-profile page in which one or more users may add content, make declarations, or express themselves, particularly in relation to the concept corresponding to concept node 704.

In particular embodiments, a concept node 704 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 702 corresponding to the user and a concept node 704 corresponding to the third-party webpage or resource and store edge 706 in one or more data stores.

In particular embodiments, a pair of nodes in social graph 700 may be connected to each other by one or more edges 706. An edge 706 connecting a pair of nodes may represent a relationship between the pair of nodes. In particular embodiments, an edge 706 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 706 connecting the first user's user node 702 to the second user's user node 702 in social graph 700 and store edge 706 as social-graph information in one or more of data stores 164. In the example of FIG. 7, social graph 700 includes an edge 706 indicating a friend relation between user nodes 702 of user "A" and user "B" and an edge indicating a friend relation between user nodes 702 of user "C" and user "B." Although this disclosure describes or illustrates particular edges 706 with particular attributes connecting particular user nodes 702, this disclosure contemplates any suitable edges 706 with any suitable attributes connecting user nodes 702. As an example and not by way of limitation, an edge 706 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 700 by one or more edges 706.

In particular embodiments, an edge 706 between a user node 702 and a concept node 704 may represent a particular action or activity performed by a user associated with user node 702 toward a concept associated with a concept node 704. As an example and not by way of limitation, as illustrated in FIG. 7, a user may "like," "attended," "played," "listened," "cooked," "worked at," or "watched" a concept, each of which may correspond to a edge type or subtype. A concept-profile page corresponding to a concept node 704 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 706 and a "used" edge (as illustrated in FIG. 7) between user nodes 702 corresponding to the user and concept nodes 704 corresponding to the song and application to indicate that the user listened to the song and used the application. Moreover, social-networking system 160 may create a "played" edge 706 (as illustrated in FIG. 7) between concept nodes 704 corresponding to the song and the application to indicate that the particular song was played by the particular application. In this case, "played" edge 706 corresponds to an action performed by an external application (SPOTIFY) on an external audio file (the song "Imagine"). Although this disclosure describes particular edges 706 with particular attributes connecting user nodes 702 and concept nodes 704, this disclosure contemplates any suitable edges 706 with any suitable attributes connecting user nodes 702 and concept nodes 704. Moreover, although this disclosure describes edges between a user node 702 and a concept node 704 representing a single relationship, this disclosure contemplates edges between a user node 702 and a concept node 704 representing one or more relationships. As an example and not by way of limitation, an edge 706 may represent both that a user likes and has used at a particular concept. Alternatively, another edge 706 may represent each type of relationship (or multiples of a single relationship) between a user node 702 and a concept node 704 (as illustrated in FIG. 7 between user node 702 for user "E" and concept node 704 for "SPOTIFY").

In particular embodiments, social-networking system 160 may create an edge 706 between a user node 702 and a concept node 704 in social graph 700. As an example and not by way of limitation, a user viewing a concept-profile page (such as, for example, by using a web browser or a special-purpose application hosted by the user's client system 130) may indicate that he or she likes the concept represented by the concept node 704 by clicking or selecting a "Like" icon, which may cause the user's client system 130 to send to social-networking system 160 a message indicating the user's liking of the concept associated with the concept-profile page. In response to the message, social-networking system 160 may create an edge 706 between user node 702 associated with the user and concept node 704, as illustrated by "like" edge 706 between the user and concept node 704. In particular embodiments, social-networking system 160 may store an edge 706 in one or more data stores. In particular embodiments, an edge 706 may be automatically formed by social-networking system 160 in response to a particular user action. As an example and not by way of limitation, if a first user uploads a picture, watches a movie, or listens to a song, an edge 706 may be formed between user node 702 corresponding to the first user and concept nodes 704 corresponding to those concepts. Although this disclosure describes forming particular edges 706 in particular manners, this disclosure contemplates forming any suitable edges 706 in any suitable manner.

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 160) or RSVP (e.g., through social-networking system 160) to an event associated with the advertisement. In addition or as an alternative, an advertisement may include social-networking-system content directed to the user. As an example and not by way of limitation, an advertisement may display information about a friend of the user within social-networking system 160 who has taken an action associated with the subject matter of the advertisement.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 700, social-networking system 160 may analyze the number and/or type of edges 706 connecting particular user nodes 702 and concept nodes 704 when calculating a coefficient. As an example and not by way of limitation, user nodes 702 that are connected by a spouse-type edge (representing that the two users are married) may be assigned a higher coefficient than a user nodes 702 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 700. As an example and not by way of limitation, social-graph entities that are closer in the social graph 700 (i.e., fewer degrees of separation) may have a higher coefficient than entities that are further apart in the social graph 700.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 8:
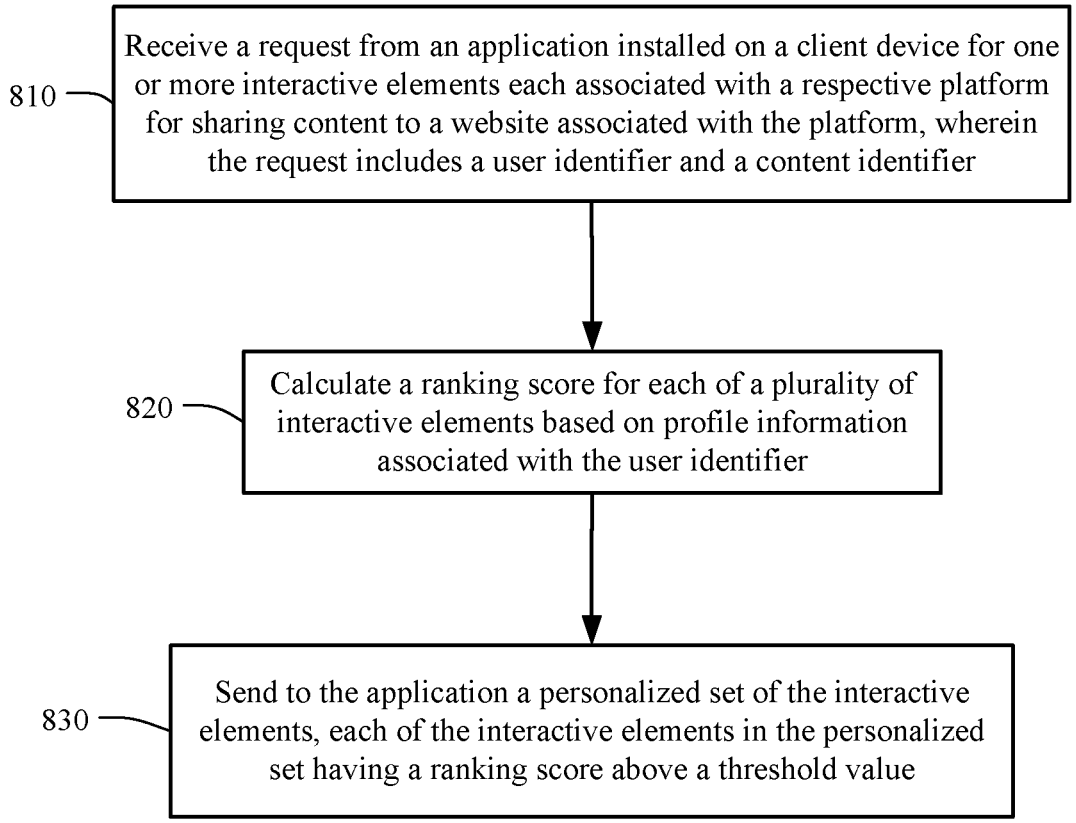
FIG. 8 illustrates an example method for determining and sending a personalized set of interactive elements to an application.

FIG. 8 illustrates an example method 800 for determining and sending a personalized set of interactive elements to an application. The method may begin at step 810, where social-networking system 160 may receive a request from an application installed on a client system 130 for one or more interactive elements each associated with a respective platform for sharing content to a website associated with the platform, wherein the request includes a user identifier and a content identifier. At step 820, social-networking system 160 may Calculate a ranking score for each of a plurality of interactive elements based on profile information associated with the user identifier. At step 830, social-networking system 160 may send to the application a personalized set of the interactive elements, each of the interactive elements in the personalized set having a ranking score above a threshold value. Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for determining and sending a personalized set of interactive elements to an application including the particular steps of the method of FIG. 8, this disclosure contemplates any suitable method for determining and sending a personalized set of interactive elements to an application including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Figure 9:
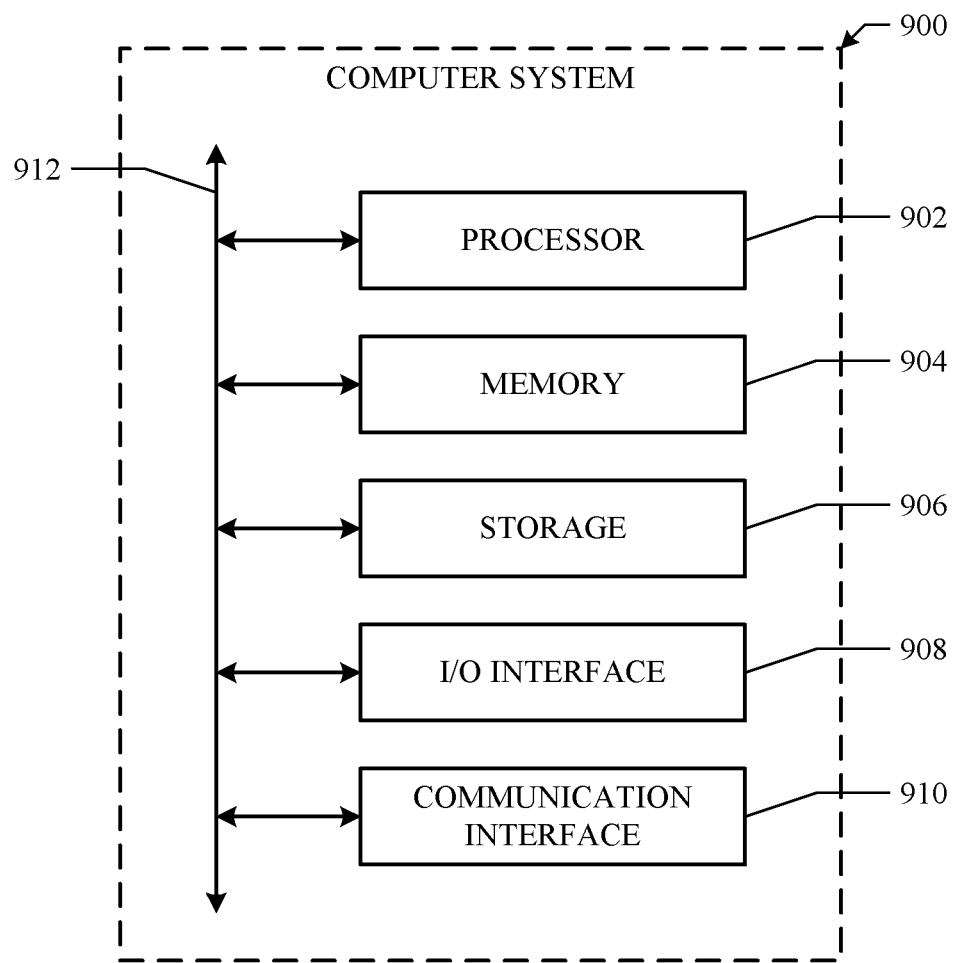
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method performed by a computer server machine, the method comprising:
   receiving, from an application installed on a client system of a user, a request indicating a content item accessed by the user, the request comprising a user identifier associated with the user and a content identifier associated with the content item;
   retrieving profile information of the user based on the user identifier;
   retrieving a plurality of interactive elements,
   wherein each interactive element of the plurality of interactive elements specifies an action to share the content item with a respective platform;
   determining at least one property associated with the content item;
   identifying a correlation between the at least one property associated with the content item and the respective platform of each interactive element of the plurality of interactive elements;
   calculating a respective ranking score for each interactive element of the plurality of interactive elements based on the profile information of the user and the respective identified correlation;
   extracting a set of interactive elements from the plurality of interactive elements based on the respective ranking score of each of the plurality of interactive elements, where each interactive element of the extracted set of interactive elements has a ranking score above a threshold value; and
   sending, to the application of the user, the extracted set of interactive elements.

2. The method of claim 1, wherein the profile information comprises information from a social graph of a social-networking system, the social graph comprising a plurality of edges and nodes connecting the nodes, each of the edges between two of the nodes representing a single degree of separation between them, the nodes comprising:
   a first node corresponding to the user associated with the user identifier; and
   a plurality of other nodes that each correspond to concepts or users associated with the social-networking system.

3. The method of claim 1, wherein the profile information comprises an engagement level of the user with the respective platform of each interactive element of the plurality of interactive elements.

4. The method of claim 1, wherein the profile information comprises a location associated with the user associated with the user identifier.

5. The method of claim 1, wherein the profile information comprises demographic information associated with the user associated with the user identifier.

6. The method of claim 1, wherein the profile information comprises information received from the application about previous interactions with other content on the application, the previous interactions having been performed by the user associated with the user identifier.

7. The method of claim 1, wherein the profile information comprises information stored on one or more devices associated with the user associated with the user identifier.

8. The method of claim 1, wherein a ranking score of a respective interactive element is further based on information associated with one or more connections of the user, wherein each of the connections previously interacted with content item.

9. The method of claim 1, wherein a ranking score of a respective interactive element is further based on a content type associated with the content item, the content type being a media format.

10. The method of claim 1, wherein a ranking score of a respective interactive element is further based on information associated with a publisher of the content item.

11. The method of claim 1, wherein a ranking score of a respective interactive element is further based on an analysis of the content item to determine one or more topics associated with the content item, the ranking score of the respective interactive element being based on a correlation between one or more of the determined topics and the platform associated with the respective interactive element.

12. The method of claim 11, wherein the identifying of the correlation further comprises:
   identifying one or more multimedia objects embedded in the content item; and
   determining one or more of the topics associated with the content item based on the identified multimedia objects.

13. The method of claim 1, further comprising:
   retrieving, from a respective platform of an interactive element of the extracted set of interactive elements, a total number of interactions with the content item; and
   sending to the application, together with the extracted set of the interactive elements, additional information related to the content item, the additional information comprising the total number of interactions with the content item.

14. The method of claim 2, further comprising:
   sending to the application, together with the extracted set of the interactive elements, additional social-networking information related to the content item.

15. The method of claim 14, wherein the additional social-networking information comprises a visual representation of one or more selected social connections of the user, the one or more selected social connections being selected by:
   identifying one or more social connections of the user by querying the social graph for first-degree connections of the user, wherein the first-degree connections are social connections having a single degree of separation from the user;
   determining one or more of the identified social connections who have interacted with the content item;
   calculating a social-relevance score for each of the one or more determined social connections based on a measure of previous social interactions between the determined social connection and the user; and
   selecting one or more of the determined social connections having a social-relevance score greater than a threshold value.

16. The method of claim 1, further comprising:
   receiving a user input, wherein the user input comprises an interaction with a first interactive element; and
   in response to the user input, sharing the content item on the respective platform associated with the first interactive element.

17. One or more computer-readable non-transitory storage media embodying software that is operable when executed to:
   receive, from an application installed on a client system of a user, a request indicating a content item accessed by the user, the request comprising a user identifier associated with the user and a content identifier associated with the content item;

retrieve profile information of the user based on the user identifier;

retrieve a plurality of interactive elements, wherein each interactive element of the plurality of interactive elements specifies an action to share the content item with a respective platform;

determine at least one property associated with the content item;

identify a correlation between the at least one property associated with the content item and the respective platform of each interactive element of the plurality of interactive elements;

calculate a respective ranking score for each interactive element of the plurality of interactive elements based on the profile information of the user and the respective identified correlation;

extract a set of interactive elements from the plurality of interactive elements based on the respective ranking score of each of the plurality of interactive elements, where each interactive element of the extracted set of interactive elements has a ranking score above a threshold value; and send, to the application of the user, the extracted set of interactive elements.

18. A system comprising: one or more processors; and a memory coupled to the processors comprising instructions executable by the processors, the processors being operable when executing the instructions to:

receive, from an application installed on a client system of a user, a request indicating a content item accessed by the user, the request comprising a user identifier associated with the user and a content identifier associated with the content item;

retrieve profile information of the user based on the user identifier;

retrieve a plurality of interactive elements, wherein each interactive element of the plurality of interactive elements specifies an action to share the content item with a respective platform;

determine at least one property associated with the content item;

identify a correlation between the at least one property associated with the content item and the respective platform of each interactive element of the plurality of interactive elements;

calculate a respective ranking score for each interactive element of the plurality of interactive elements based on the profile information of the user and the respective identified correlation;

extract a set of interactive elements from the plurality of interactive elements based on the respective ranking score of each of the plurality of interactive elements, where each interactive element of the extracted set of interactive elements has a ranking score above a threshold value; and send, to the application of the user, the extracted set of interactive elements.

19. The method of claim 1, wherein each of the plurality of interactive elements is configured to share the content item via the platform associated with each respective interactive element.

20. The method of claim 11, wherein the identifying of the correlation further comprises:

extracting one or more n-grams from text associated with the content item; and determining one or more of the topics associated with the content item based on the extracted one or more n-grams.

21. The method of claim 1, further comprising:

sending, to the application of the user, a trigger element; and sending, in response to selection of the trigger element by the user, the extracted set of interactive elements to the application of the user.

* * * * *